United States Patent [19]

Wada et al.

[11] Patent Number: 5,086,104
[45] Date of Patent: Feb. 4, 1992

[54] POLYESTER RESIN COMPOSITIONS EXHIBITING LONG-TERM TEMPERATURE RESISTANCE, AND MOLDED ARTICLES FORMED OF THE SAME

[75] Inventors: Mitsuo Wada; Koichi Kato, both of Shizuoka, Japan

[73] Assignee: Polyplastics Co., Ltd., Osaka, Japan

[21] Appl. No.: 647,632

[22] Filed: Jan. 31, 1991

[30] Foreign Application Priority Data

Feb. 2, 1990 [JP] Japan .................................. 2-24187

[51] Int. Cl.$^5$ .......................... C08K 5/37; C08K 5/20
[52] U.S. Cl. ................................. 524/217; 524/219; 524/223; 524/225
[58] Field of Search .............. 524/219, 217, 223, 225, 524/913; 564/154, 156, 157, 158, 159, 160; 525/444

[56] References Cited

U.S. PATENT DOCUMENTS

| | | | |
|---|---|---|---|
| 3,312,620 | 4/1967 | Low et al. | 564/160 |
| 3,470,131 | 9/1969 | Baitinger | 524/217 |
| 3,856,748 | 12/1974 | Dexter et al. | 564/158 |
| 3,896,078 | 7/1975 | Hoeschele | 524/219 |
| 3,907,926 | 9/1975 | Brown et al. | 525/444 |
| 4,119,789 | 10/1978 | Braus et al. | 564/160 |
| 4,661,546 | 4/1987 | Abu-Isa et al. | 525/444 |

FOREIGN PATENT DOCUMENTS

277515  4/1962  Netherlands .

*Primary Examiner*—Veronica P. 6 Hoke
*Attorney, Agent, or Firm*—Nixon & Vanderhye

[57] ABSTRACT

Polyester resin compositions include a crystalline thermoplastic polyester resin (such as polybutylene terephthalate), a polyester elastomer (such as a copolymer including recurring hard and soft segments) and between 0.005 to 10 parts by weight, based on 100 parts of the crystalline and elastomeric resins, of an amide compound having the formula (I)

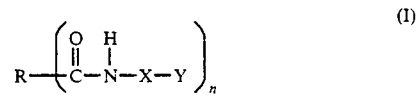

wherein R is an organic group such as an aromatic ring, X is an alkylene of $C_2$ to $C_{10}$ such as ethylene and propylene, Y is —COOH, —OH, —SH or —NH$_2$ and n is 2 to 4, inclusive.

9 Claims, No Drawings

POLYESTER RESIN COMPOSITIONS EXHIBITING LONG-TERM TEMPERATURE RESISTANCE, AND MOLDED ARTICLES FORMED OF THE SAME

FIELD OF INVENTION

The present invention relates to the field of polyester resin compositions and to molded articles formed of the same. More specifically, the present invention relates to polyester resin molding compositions which exhibit excellent toughness at low temperatures and improved thermal resistance properties (particularly durability at high temperatures). The resin compositions of the present invention are suitably employed as a material from which automotive parts and electric and electronic appliance parts (such as connectors, switches and relays) may be fabricated.

BACKGROUND AND SUMMARY OF THE INVENTION

Crystalline thermoplastic polyester resins having excellent mechanical, electrical, physical and chemical properties and workability, such as polyalkylene terephthalate resins, are conventionally used as engineering plastics in the production of automotive parts and electric or electronic components. However, improved and/or special properties for polyester resins must be developed as a result of new end-use applications being proposed. In this regard, it is important in some high-temperature end-use applications for the resin to exhibit satisfactory thermal resistance properties (e.g., long-term thermal resistance). For example, the automotive industry requires that resins have excellent mechanical properties, particularly flexibility and toughness (such as impact resistance), at low temperatures and that these "low temperature" properties be maintained even during use at high temperatures for prolonged periods of time.

A technique for satisfying these requirements has been proposed wherein a thermoplastic elastomer, such as a polycarbonate, olefinic polymer or rubbery polymer, is incorporated into the thermoplastic polyester resin in combination with an epoxy resin or polycarbodiimide. Although polyester resins containing an elastomer and additives do exhibit (to some extent) improved mechanical properties, the resins are problematic since surface peeling usually occurs due to poor compatibility of the components. Thus, long-term thermal resistance of such conventional resins is insufficient. Further improvements have therefore been needed in this respect.

According to the present invention, polyester resin compositions are provided having excellent durability, particularly properties that are stable during use at high temperatures for prolonged time periods. These improvements have been made without impairing the otherwise excellent mechanical properties associated with polyester resins, particularly its toughness and moldability.

Broadly, the present invention relates to polyester resin compositions exhibiting long-term temperature resistance properties and to molded articles formed of the same which includes a polyester base resin comprised of a major amount of a crystalline thermoplastic polyester resin and a minor amount of a polyester elastomer, and an effective amount of an amide compound to impart long-term temperature resistance properties to the polyester base resin.

The present invention more specifically relates to a polyester resin composition comprising:

(A) between about 60 to 99 parts by weight of a crystalline thermoplastic polyester resin, (B) between about 1 to 40 parts by weight of a polyester elastomer wherein the total of components (A) and (B) is 100 parts by weight, and (C) between about 0.005 to 10 parts by weight of an amide compound of the general formula (I):

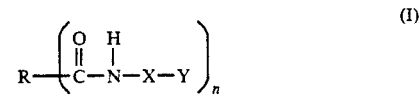

wherein R represent an n-valent organic group, X represents an alkylene group having 2 to 10 carbon atoms or a substituted derivative thereof, Y represents —COOH, —OH, —SH or —NH$_2$, and n represents an integer from 2 to 4, inclusive.

Further aspects and advantages of this invention will become more clear after careful consideration is given to the detailed description of the preferred exemplary embodiments thereof which follows.

DETAILED DESCRIPTION OF THE PREFERRED EXEMPLARY EMBODIMENTS

The crystalline thermoplastic polyester resin component (A) used in the present invention is a crystalline polyester produced by the polycondensation of a dicarboxylic acid compound and a low-molecular dihydroxy compound, that of a hydroxy carboxylic acid compound or that of a mixture of these three components. The compositions of the present invention may include either crystalline homopolyester and/or copolyester resins.

Examples of the dicarboxylic acid compounds usable herein include known dicarboxylic acids such as terephthalic acid, isophthalic acid, naphthalenedicarboxylic acid, diphenyldicarboxylic acid, diphenyl ether dicarboxylic acid, diphenylethanedicarbocylic acid, cyclohexanedicarboxylic acid, adipic acid and sebacic acid as well as substituted derivatives thereof. These dicarboxylic acid compounds can be subjected to polymerization in the form of an ester-forming derivative thereof, such as a lower alcohol ester (e.g. dimethyl ester). In addition, the dicarboxylic acid compounds may be used either alone or in a combination of two or more of the same.

Examples of the dihydroxy compounds constituting the crystalline polyester (A) of the present invention include dihydroxy compounds such as ethylene glycol, propylene glycol, butanediol, neopentyl glycol, hydroquinone, resorcinol, dihydroxyphenyl, naphthalenediol, dihydroxy diphenyl ether, cyclohexanediol, 2,2-bis(4-hydroxyphenyl)propane and diethoxybisphenol A as well as substituted derivatives thereof. These dihydroxy compounds can be used either alone or in the form of a mixture of two or more such compounds.

Examples of the hydroxy carboxylic acids include hydroxybenzoic acid, hydroxynaphthoic acid and diphenylenoxycarboxylic acid as well as substituted derivatives thereof. Ester-forming derivatives thereof are also usable. Likewise, the hydroxy carboxylic acids may be used either alone or in a combination of two or more of the same.

In addition, polyesters having a branched or crosslinked structure and comprised of a small amount of a trifunctional monomer such as trimellitic acid, trimesic acid, pyromellitic acid, pentaerythritol or trimethylolpropane can also be used in the compositions of this invention.

Any of the crystalline thermoplastic polyesters produced by the polycondensation of the above-described compounds as the monomer components can be used as the crystallizing polyester resin in the compositions of the present invention. Preferred is a polyester resin mainly comprised of a polyalkylene terephthalate, particularly polybutylene terephthalate.

The polyester elastomer component (B) that may be used in the compositions of the present invention is a copolymer comprised of relatively "hard" and "soft" segments connected head to tail through polyester linkages. More specifically, the polyester elastomer is a copolyester comprised of a hard segment derived from a polyester of a low-molecular weight diol, and a soft segment derived from an ester of a polyetherdiol having a number-average molecular weight of about 200 to 6,000. The ratio of the hard segment to the soft segment is between 1 to 99 (% by weight)/99 to 1 (% by weight), and preferably 5 to 95 (% by weight)/95 to 5 (% by weight). The dicarboxylic acids forming the hard segment of the polyester include aromatic dicarboxylic acids such as terephthalic acid, isophthalic acid, 2,6- and 1,5-naphthalene dicarboxylic acid and bis(p-carboxyphenyl) methane; alicyclic dicarboxylic acids such as 1,4-cyclohexanedicarboxylic acid and cyclopentane dicarboxylic acid; and aliphatic dicarboxylic acids such as adipic acid and sebacic acid. From the viewpoints of the mechanical properties and thermal resistance properties, it is preferred that at least 50 molar % thereof comprises an aromatic dicarboxylic acid, particularly terephthalic acid or isophthalic acid.

The diol components constituting the hard segment are aliphatic or alicyclic diols having 2 to 12 carbon atoms, such as ethylene glycol, propylene glycol, 1,4-butanediol, 1,4-butenediol, neopentyl glycol, 1,5-pentanediol, and 1,6-hexanediol; bisphenols such as bis(p-hydroxy)diphenyl, bis(p-hydroxyphenyl)methane and bis(p-hydroxyphenyl)propane; and mixtures of thereof. Among them, aliphatic diols having 2 to 8 carbon atoms are particularly preferred.

The acids usable to form the above-described hard segment are also used as the carboxylic acid compounds constituting the soft segment of the polyester elastomer (B). The preferred diol components include polyether diols, particularly poly(alkylene oxide) glycols. Specific examples include poly(ethylene oxide) glycol, poly(1,3- and 1,2-propylene oxide) glycol, poly(tetramethylene oxide) glycol, polyethylene oxide/polypropylene oxide block copolymer glycol and polyethylene oxide/poly(tetramethylene oxide) block copolymer glycol. Among them, poly(tetramethylene oxide) glycol is particularly preferred and a combination of such diols can also be used. The average molecular weight of these polyether glycols ranges from about 200 to about 6,000.

The polyester elastomers (B) can be produced by any suitable process. Some of the polyester elastomers that may be used in the compositions of this invention are commercially available from several sources on the market.

Particularly preferred polyester elastomers useable as the component (B) are those comprised of a hard segment of polyethylene terephthalate, polybutylene terephthalate or polybutene terephthalate, and a soft segment of a terephthalate and/or isophthalate of a polyethylene oxide glycol or polybutylene oxide glycol having a molecular weight of 200 to 6,000.

The crystalline thermoplastic polyester resin component (A) to the polyester elastomer component (B) in amounts between about 60 to 99 parts by weight of the component (A) per about 1 to 40 parts by weight of the component (B). Preferably, between about 70 to 97 parts by weight of the component (A) is used per between about 3 to 30 parts by weight of the component (B).

When the amount of the polyester elastomer used as the component (B) exceeds 40 parts by weight, the rigidity of the resin composition is impaired. On the contrary, when it is used in amounts of less than 1 part by weight, insufficient impact resistance improvements are obtained.

As described above, the composition of the present invention is especially characterized by the use of a specified amount of an amide compound (C) of the general formula (I) which is incorporated (blended) into the crystalline thermoplastic polyester (A) and the polyester elastomer (B). The incorporation of this amide compound into the polyester composition imparts excellent flexibility at low temperatures and toughness (such as impact resistance) to the composition. In addition, molded parts of the composition do not "peel" due to the compatibility of the components.

The compositions of this invention are thus capable of retaining their initial properties during use at high temperatures for prolonged periods of time.

The amide compounds (C) incorporated for this purpose are those of the following formula (I):

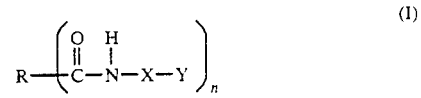

(I)

wherein R represents an n-valent organic group, X represents an alkylene group having 2 to 10 carbon atoms or a substituted derivative thereof, Y represents —COOH, —OH, —SH or —NH$_2$, and n represents an integer from 2 to 4, inclusive.

R preferably is an n-valent (i.e. divalent, trivalent or tetravalent) organic group such as an alkylene group having 1 to 10 carbon atoms, an arylene group having 6 to 12 carbon atoms, a cycloalkylene group having 5 to 12 carbon atoms or an aralkylene group having 8 to 20 carbon atoms. Specific examples of the alkylene groups include methylene, ethylene, propylene, butylene, pentylane, hexamethylene, octamethylene, nonamethylene, decamethylene and dimethylmethylene groups. Examples of the arylene groups include phenylene, naphthylene and diphenylene groups. An example of the cycloalkylene groups is a cyclohexylene group. R is most preferably an aromatic group, particularly a phenylene group.

X in the formula (I) is an alkylene group having 2 to 10 carbon atoms or a substituted derivative thereof. The substituents include allkyl groups having 1 to 10 carbon atoms, aryl groups having 6 to 12 carbon atoms, cycloalkyl groups having 5 to 12 carbon atoms, and aralkyl groups having 8 to 20 carbon atoms. In particular, examples of the alkyl groups include methyl, ethyl, propyl, butyl, pentyl, hexamethyl, octamethyl, nonamethyl, decamethyl and dimethylmethyl groups. Examples of the aryl groups include phenyl, naphthyl and diphenyl groups and an example of the cycloalkyl group is a cyclohexyl group. Among them, X is preferably an ethylene or propylene group.

Y in the formula (I) is —COOH, —OH, —SH, or —NH$_2$, among which —COOH or —OH is preferred.

Particular examples of the amide compounds (B) included within the definition of the general formula (I) include
N,N'-bis(2-carboxyethyl)-malonamide,
N,N'-bis(2-carboxyethyl)succinamide,
N,N'-bis(2-carboxyethyl)glutaramide,
N,N'-bis(2-carboxyethyl)adipamide,
N,N'-bis(2-carboxyethyl)isophthalamide,
N,N'-bis(2-carboxyethyl)terephthalamide,
N,N'-bis(3-carboxypropyl)malonamide,
N,N'-bis(3-carboxypropyl)succinamide,
N,N'-bis(3-carboxypropyl)glutaramide,
N,N'-bis(3-carboxypropyl)adipamide,
N,N'-bis(3-carboxypropyl)terephthalamide,
N,N'-bis(2-hydroxyethyl)malonamide,
N,N'-bis(2-hydroxyethyl)succinamide,
N,N'-bis(2-hydroxyethyl)gluthramide,
N,n''-bis(2-hydroxyethyl)adipamide,
N,N'-bis(2-hydroxyethyl)isophthalamide,
N,N'-bis(2-hydroxyethyl)terephthalamide,
N,N'-bis(3-hydroxypropyl)malonamide,
N,N'-bis(hydroxypropyl)succinamide,
N,N'-bis(3-hydroxypropyl)glutaramide,
N,N'-bis(3-hydroxypropyl)adipamide,
N,N'-bis(3-hydroxypropyl)isophthalamide,
N,N'-bis(3-hydroxypropyl)terephthalamide,
N,N',N''-tris(2-hydroxyethyl)trimesamide, and
3,3',5,5'-tetrakis(2-hydroxyethylaminocarboxyl)biphenyl.

They can be used either alone or in combinations of two or more of the same.

Among these compounds, particularly preferred are
N,N'-bis(2-carboxyethyl)isophthalamide,
N,N'-bis(3-carboxylpropyl)isophthalamide,
N,N'-bis(2-carboxyethyl)terephthalamide,
N,N'-bis(3-carboxypropyl)terephthalamide,
N,N'-bis(2-hydroxyethyl)isophthalamide,
N,N'-bis(2-hydroxypropyl)isophthalamide,
N,N'-bis(2-hydroxyethyl)terephthalamide and
N,N,-bis(2-hydroxypropyl)terephthalamide.

The amount of the amide compound (C) used in the compositions of this invention is between about 0.005 to 10 parts by weight, preferably between about 0.01 to 5 parts by weight, per 100 parts by weight of the total of the components (A) and (B). Since the amide compounds have a strong affinity for one another, as well as the polyester base resin owing to the hydrogen bond, they do not sublime even when subjected to increased temperatures. As a result, the beneficial effects of the amide compounds are exhibited when only small quantities (e.g., less then 10 parts by weight) are used. However, little (if any) effect is observed when the amount of the amide compound is less than 0.005 parts by weight. On the other hand, when the amide compound is present in an excessive amount, it impairs the otherwise excellent properties of the polyester resin.

The effect of the composition of the present invention can be further improved by optionally incorporating one or more antioxidants such as hindered phenols, phosphorus and thioether antioxidants. Examples of the hindered phenolic antioxidants include 2,2'-methylenebis(4-methyl-6-t-butylphenol),hexamethylene glycol bis(3,5-di-t-butyl-4-hydroxyhydrocinnamate), tetrakis[methylene(3,5-di-t-butyl-4-hydroxyhydrocinnamato)]methane, triethylene glycol bis-3-(3-t-butyl-4-hydroxy-5-methylphenyl)-propionate, 1,3,5-trimethyl-2,4,6-tris(3,5-di-t-butyl-4-hydroxybenzyl)benzene, n-octadecyl 3-(4'-hydroxy-3',5-di-t-butylphenyl)propionate, 4,4'-methylenebis(2,6-di-t-butylphenol), 4,4'-butylidenebis(6-t-butyl-3-methylphenol), 2,2'-thiodiethybis[3-(3,5-di-t-butyl-4-hydroxyphenyl)propionate, distearyl 3,5-di-t-butyl-4-hydroxybenzylphosphonate, and 2-t-butyl-6-(3-t-butyl-5-methyl-2-hydroxybenzyl)-4-methylphenyl acrylate.

The phosphorus antioxidants are preferably organic phosphite and phosphonite compounds. They include compounds of the following general formula (2):

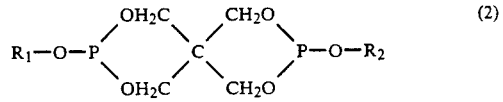

wherein $R_1$ and $R_2$ may be the same or different from each other and each represent an alkyl, substituted alkyl, aryl, substituted aryl or alkoxy group.

From the viewpoint of the stability during processing, $R_1$ and $R_2$ are each preferably an alkyl, substituted alkyl or alkoxy group having at least 6 carbon atoms, or an aryl or substituted aryl group. Particularly preferably, $R_1$ and $R_2$ each represent an aryl or substituted aryl group. Examples of them include phenyl, naphthyl and diphenyl groups as well as derivatives thereof substituted with an alkyl, hydroxy and/or alkoxy group. Examples of them include bis(2,4-di-t-butylphenyl)pentaerythritol diphosphite, bis(nonylphenyl)pentaerythritol diphosphite, and 4-phenoxy-9-α-(4-hydroxyphenyl)-p-cumenyloxy-3,5,8,10-tetraoxa-4,9-diphosphaspiro [5.5]undecane.

Examples of the thioether antioxidants include dilauryl thiodipropionate, dimyristyl thiodipropionate, distearyl thiodipropionate, lauryl stearyl thiodipropionate, tetrakis[methylene 3-(dodecylthio)propionate]methane and dialkyl ($C_{12}$ to $C_{18}$) 3,3-thiodiproprionate.

The amount of the antioxidant is between 0.05 to 5% by weight, preferably between 0.1 to 3% by weight, based on the total weight of the composition.

The resin composition of the present invention can be used in combination with a small amount of another subsidiary thermoplastic resin provided the beneficial effects of the present invention are not deleteriously affected.

In this regard, subsidiary thermoplastic resins that may be used herein may be any thermoplastic resin which is stable at high temperatures. These thermoplastic resins include polyolefinic polymers, polyamides, ABS, polyphenylene oxides, polyalkyl acrylates, polyacetals, polysulfones, polyether sulfones, polyether imides, polyether ketones and fluororesins. They can be used either alone or in the form of a blend of two or more such resins.

The compositions of the present invention may also contain known substances usually added to thermoplastic and thermosetting resins, such as stabilizers, e.g., antioxidants, thermal stabilizers and ultra-violet absorbers; anti-static agents; flame-retardants; flame-retarding assistants, colorants, e.g., dyes and pigments; lubricants; plasticizers; crystallization promoters and nucleating agents; and inorganic fillers in order to obtain a composition having desired properties suitable for the intended end-use application. Preferred inorganic fillers include ordinary inorganic fibers such as glass fibers, carbon fibers, ceramic fibers, boron fibers, potassium titanate fibers and asbestors; powdery or granular substances such as calcium carbonate, high-dispersion silicates, alumina, aluminum hydroxide talc, clay, mica, glass flakes, glass powder, glass beads, quartz powder, siliceous sand, wollanstonite, carbon black, barium sulfate, plaster of Paris, silicon carbide, alumina, boron nitrite and silicon nitride; platy inorganic compounds; and whiskers. These inorganic fillers may be used alone or, if necessary, in the form of a mixture of two or more of the same.

The compositions of the present invention can be produced easily by ordinary processing techniques using apparatus ordinarily employed in the production of resin compositions. For example, the components may be mixed together and then kneaded and extruded with an extruder to form pellets with the pellets thereafter being molded. Also, pellets having different compositions may be prepared separately, with the required amounts being mixed together. The pellet mixture may then be molded to obtain molded articles having the intended composition. Finally, one or more components may be fed directly to a molding machine. In order to obtain a homogenous composition, it is preferred that a part of the resin components be finely pulverized and then mixed with other components.

The following non-limiting examples will further illustrate the preferred embodiments according to the present invention.

EXAMPLES

In the following Examples, the properties of the compositions and/or moldings were evaluated by the following techniques:

(I) Tensile Strength and Elongation

The initial strength and elongation and the elongation after heating at 120° C. for 500 h were determined according to ASTM D-638 (test pieces: ASTM type IV having a thickness of 1 mm; determination temperatures: 23° C. and 0° C.).

(2) Izod Impact Strength

The notched Izod impact strength was determined according to ASTM D-256.

EXAMPLES 1 TO 10 AND COMPARATIVE EXAMPLES 1 TO 3

Polybutylene terephthalate (A-1) having an intrinsic viscosity of 0.8 was used as the thermoplastic polyester component (A) and was mixed with the particular polyester elastomer (B) and an amide compound (C), and in the particular ratio specified in Table 1. The mixture was extruded with an extruder to form pellets of the composition. The pellets were then injection-molded to form test pieces and the above-described properties were evaluated. For comparison, compositions including a polybutylene terephthalate (A-1) mixed with either the component (B) or (C), and a composition which used an epoxy compound in place of the amide component (C) were pelletized in the same manner as was described above. The properties of these comparative mixtures were also evaluated and are provided in Table 1.

EXAMPLE 11 AND COMPARATIVE EXAMPLE 5

The same procedure as that of Example 2 was repeated except that the component (A) was replaced with a polymer mixture (A-2) of polybutylene terephthalate and polyethylene terephthalate. The properties were evaluated in the same manner as that of Example 2, with the results being given in Table 1. For comparison, the same procedure as that of Example 11 was repeated except that the component (C) was omitted. The results are also given in Table 1.

TABLE 1

| | | Composition | | | Properties | | | | |
|---|---|---|---|---|---|---|---|---|---|
| | | (A) thermoplastic polyester*1 (parts by weight) | (B) polyester elastomer*2 (parts by weight) | (C) amide compound*3 (parts by weight) | tensile strength (kg/cm²) initial (determined at 23° C.) | tensile elongation (%) | | | Izod impact strength (kg · cm/cm |
| | | | | | | initial | | after heating at 120° C. for 500 h (determined at 23° C.) | |
| | | | | | | determined at 0° C. | determined at 23° C. | | |
| Example | 1 | A-1 (95) | B-1 (5) | C-1 (0.03) | 521 | 97 | 220 | 204 | 4.2 |
| | 2 | A-1 (95) | B-1 (5) | C-1 (0.1) | 515 | 90 | 230 | 221 | 4.5 |
| | 3 | A-1 (95) | B-1 (5) | C-1 (0.3) | 517 | 95 | 226 | 219 | 4.3 |
| | 4 | A-1 (95) | B-1 (5) | C-1 (1.0) | 505 | 79 | 217 | 211 | 4.3 |
| | 5 | A-1 (90) | B-1 (10) | C-1 (0.1) | 430 | 109 | 244 | 195 | 9.8 |
| | 6 | A-1 (80) | B-1 (20) | C-1 (0.1) | 359 | 114 | 240 | 190 | 25.0 |
| | 7 | A-1 (95) | B-2 (5) | C-1 (0.1) | 511 | 100 | 254 | 216 | 4.5 |
| | 8 | A-1 (95) | B-1 (5) | C-2 (0.1) | 523 | 87 | 226 | 201 | 4.4 |
| | 9 | A-1 (95) | B-1 (5) | C-3 (0.1) | 515 | 88 | 221 | 196 | 4.4 |
| | 10 | A-1 (95) | B-1 (5) | C-4 (0.1) | 513 | 94 | 210 | 195 | 4.1 |
| | 11 | A-2 (95) | B-1 (5) | C-1 (0.1) | 520 | 96 | 205 | 185 | 4.0 |
| Comp. Ex. | 1 | A-1 (95) | B-1 (5) | — | 525 | 90 | 234 | 38 | 4.3 |
| | 2 | A-1 (100) | — | C-1 (0.1) | 561 | 68 | 212 | 112 | 2.9 |
| | 3 | A-1 (95) | B-1 (5) | *4 (0.1) | 522 | 71 | 226 | 29 | 3.9 |
| | 4 | A-1 (95) | B-2 (5) | — | 520 | 94 | 258 | 45 | 4.2 |

TABLE 1-continued

| | Composition | | | Properties | | | | |
| --- | --- | --- | --- | --- | --- | --- | --- | --- |
| | | | | tensile strength (kg/cm²) initial | tensile elongation (%) | | | Izod impact strength (kg · cm/cm) |
| | (A) thermoplastic polyester*¹ (parts by weight) | (B) polyester elastomer*² (parts by weight) | (C) amide compound*³ (parts by weight) | | initial | | after heating at 120° C. for 500 h | |
| | | | | (determined at 23° C.) | determined at 0° C. | determined at 23° C. | (determined at 23° C.) | |
| 5 | A-2 (95) | B-1 (5) | — | 514 | 85 | 209 | 41 | 4.3 |

Notes for Table 1:
*¹A-1 polybutylene terephthalate having intrinsic viscosity of 0.8,
A-2 polymer mixture of 75 parts by weight of polybutylene terephthalate (A-1) and 25 parts by weight of polyethylene terephthalat (intrinsic viscosity: 0.7),
*¹B-1 polyester elastomer comprising polybutylene terephthalate segment and polytetramethylene oxide terephthalate segment,
B-2 polyester elastomer comprising polybutylene terephthalate segment, polybutene terephthalate segment and polytetramethylene oxide terephthalate,
*³C-1 N,N'-bis(2-hydroxyethyl)isophthalamide,
C-2 N,N'-bis(2-hydroxypropyl)isophthalamide,
C-3 N,N'-bis(2-hydroxyethyl)terephthalamide,
C-4 N,N'-bis(2-carboxyethyl)isophthalamide,
*⁴bisphenol A-type diepoxy compound.

It will be apparent from the above description and Examples that the resin compositions of the present invention exhibit remarkably improved thermal stability, particularly durability at high temperatures and an excellent toughness at low temperatures as compared with those of conventional polyester resin compositions containing an impact resistance modifier. At the same time, however, the mechanical properties and moldability are not impaired.

The compositions of the present invention are preferably used as mechanical materials and as materials from which automotive parts and electric appliance parts (which are to be used at high temperatures over prolonged time periods) such as connectors, coil bobbins, switches and relays, may be fabricated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polyester resin composition comprising:
(A) between 60 to 99 parts by weight of a crystalline thermoplastic polyester resin,
(B) between 1 to 40 parts by weight of a polyester elastomer, wherein the total amount of components (A) and (B) is 100 parts by weight, and
(C) between 0.005 to 10 parts by weight of an amide compound of the general formula (I):

$$R \pm\left(\begin{array}{c} O\ H \\ \| \ \ | \\ C-N-X-Y \end{array}\right)_n \quad (I)$$

wherein R represents an n-valent organic group, X represents an alkylene group having 2 to 10 carbon atoms or a substituted derivative thereof, Y represents —COOH, —OH, —SH or —NH₂ and n represents an integer from 2 to 4, inclusive.

2. A polyester resin composition according to claim 1, wherein R is an aromatic group.

3. A polyester resin composition according to claim 1 or 2, wherein X is an ethylene or propylene group, or a substituted derivative thereof.

4. A polyester resin composition according to claim 1 or 2, wherein Y is a —COOH group.

5. A polyester resin composition according to claim 1 or 2, wherein Y is a hydroxy group.

6. A polyester resin composition according to claim 1, wherein the crystalline thermoplastic polyester resin (A) is one mainly comprised of polybutylene terephthalate.

7. A polyester resin composition according to claim 1 or 6, wherein the polyester elastomer (B) is a copolyester comprised of recurring hard and soft segments connected head-to-tail through ester linkages, wherein said hard segments are derived from phthalate of a lower aliphatic glycol, and said soft segments are derived from phthalate of a polyalkylene oxide glycol.

8. Molded articles which consist essentially of a polyester resin composition according to claim 1, 2 or 6.

9. Molded articles as in claim 8, wherein the polyester elastomer (B) is a copolyester comprised of recurring hard and soft segments connected head-to-tail through ester linkages, wherein said hard segments are derived from phthalate of a lower aliphatic glycol, and said soft segments are derived from phthalate of a polyalkylene oxide glycol.

* * * * *

UNITED STATES PATENT AND TRADEMARK OFFICE
CERTIFICATE OF CORRECTION

PATENT NO.  : 5,086,104
DATED       : February 4, 1992
INVENTOR(S) : WADA et al

It is certified that error appears in the above-identified patent and that said Letters Patent is hereby corrected as shown below:

Column 1, line 65, after "which" change "includes" to --include--.

Column 2, line 33, after "molecular" insert --weight--;
          line 43, change "diphenylethanedicarbocylic" to
          --diphenylethanedicarboxylic--.

Column 3, line 10, delete "crystallizing" and insert --crystalline--;
          line 34, after "mechanical" delete "properties".

Column 4, line 6, delete "to the polyester elastomer component (B)" and
          insert --will be present in the composition--;
          line 10, after "(A)" delete "is" and insert --are--;
          line 53, delete "tylane" and insert --tylene--.

Column 5, line 23, change "gluthramide" to --glutaramide--.

Column 7, line 5, after "and" delete "asbestors" and insert --asbestos--.

Signed and Sealed this

Second Day of November, 1993

Attest:

BRUCE LEHMAN

Attesting Officer

Commissioner of Patents and Trademarks